United States Patent [19]

Case

[11] 4,026,995

[45] May 31, 1977

[54] PROCESS FOR DEFLUORINATION OF COMMERCIAL PHOSPHORIC ACID

[75] Inventor: Everett N. Case, Airville, Pa.

[73] Assignee: Atlantic Richfield Company, Los Angeles, Calif.

[22] Filed: Apr. 12, 1976

[21] Appl. No.: 676,093

Related U.S. Application Data

[63] Continuation-in-part of Ser. No. 657,117, Feb. 11, 1976, abandoned, which is a continuation-in-part of Ser. No. 448,154, March 4, 1974, abandoned.

[52] U.S. Cl. .......................... 423/321 R; 423/167; 423/319; 423/490
[51] Int. Cl.² ...................................... C01B 25/16
[58] Field of Search .......... 423/163, 167, 317, 319, 423/320, 321 R, 490

[56] References Cited

UNITED STATES PATENTS

| | | | |
|---|---|---|---|
| 3,118,731 | 1/1964 | Svanoe | 423/317 |
| 3,124,419 | 3/1964 | German et al. | 423/320 |
| 3,379,501 | 4/1968 | Treitler et al. | 423/321 |
| 3,619,136 | 11/1971 | Case | 423/320 |
| 3,684,435 | 8/1972 | Lepomaa et al. | 423/497 |
| 3,792,151 | 2/1974 | Case | 423/320 |
| 3,843,767 | 10/1974 | Faust et al. | 423/163 |
| 3,943,232 | 3/1976 | Case | 423/321 R |

FOREIGN PATENTS OR APPLICATIONS

| | | | |
|---|---|---|---|
| 1,155,957 | 6/1969 | United Kingdom | 423/321 |
| 1,220,323 | 7/1971 | United Kingdom | 423/321 |

*Primary Examiner*—O. R. Vertiz
*Assistant Examiner*—Eugene T. Wheelock
*Attorney, Agent, or Firm*—Delbert E. McCaslin

[57] ABSTRACT

A process is provided for the defluorination of wet process phosphoric acid whereby hydrogen ion is removed, and the concentration of $P_2O_5$ is adjusted with water, the calcium concentration, calculated as CaO, is adjusted by adding a source of calcium phosphate at temperatures of about 25° C. to 75° C. while maintaining a pH of about 2 or below to achieve substantially the maximum calcium content in aqueous solution and raising the temperature of the solution to about the boiling point to initiate the hydrolysis of silicofluoride and precipitate calcium fluoride which is separated, thereby producing a solution with an enhanced phosphoric acid content.

15 Claims, 1 Drawing Figure

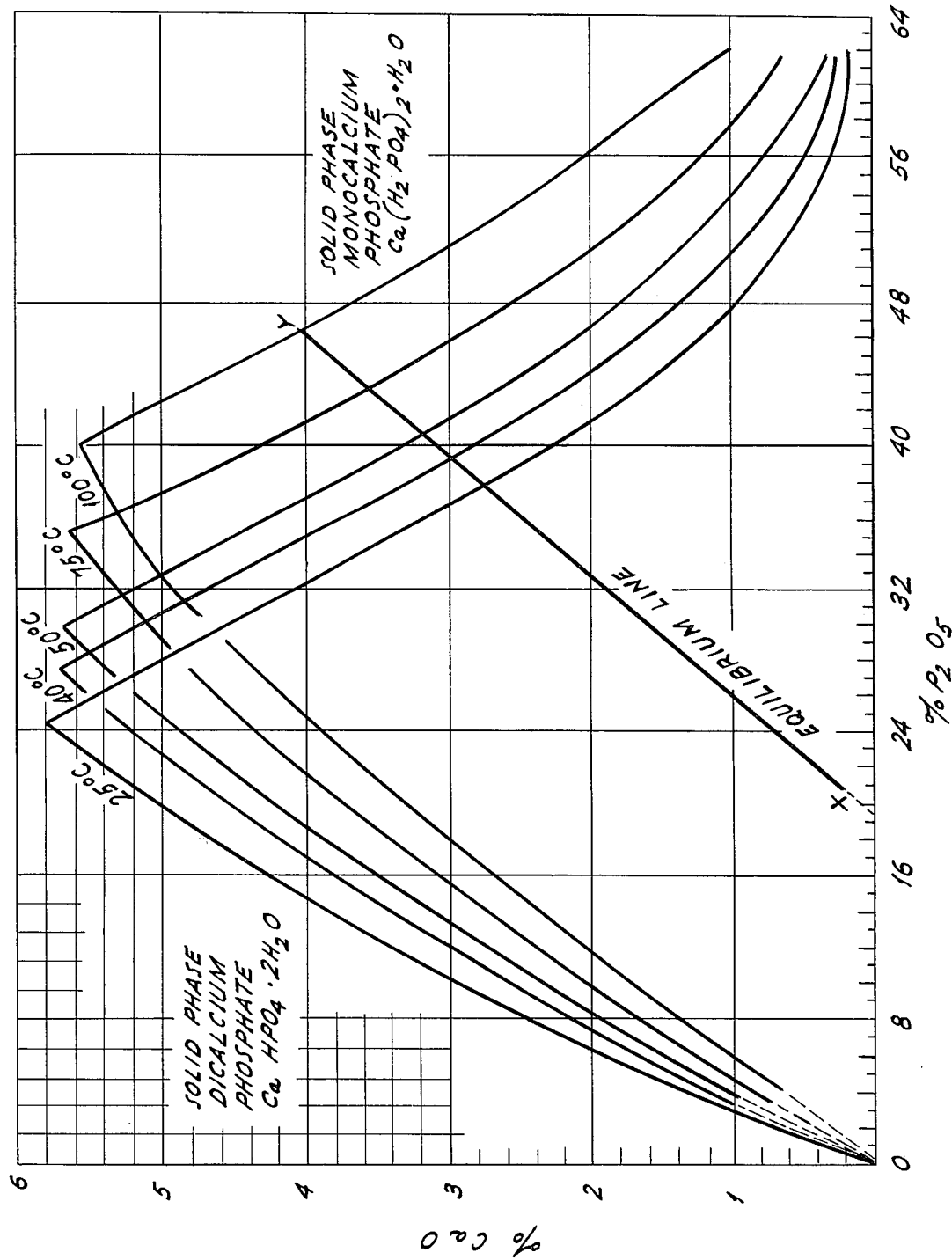

PROCESS FOR DEFLUORINATION OF COMMERCIAL PHOSPHORIC ACID

CROSS REFERENCE TO RELATED APPLICATIONS

This application is a continuation-in-part application of E. N. Case application Ser. No. 657,117, filed Feb. 11, 1976 entitled Process for Defluorination of Commercial Phosphoric Acid which in turn is a continuation application of E. N. Case application Ser. No. 448,154, filed Mar. 4, 1974 entitled Process for Defluorination of Commercial Phosphoric Acid both now abandoned.

FIELD OF THE INVENTION

The present invention relates to an improved process for the defluorination of a typical wet process phosphoric acid, and more particularly to the defluorination of wet process phosphoric acid which comprises adjusting the concentration of $P_2O_5$ in a solvent system.

BACKGROUND OF THE INVENTION

Wet process phosphoric acid is a relatively impure product, sometimes called filter acid, made by an acidulation process in which phosphate rock reacts with sulfuric acid to produce phosphoric acid and gypsum. In the acidulation process, raw rock which is primarily a calcium phosphate is treated with an acid solution composed of about 95 percent phosphoric acid and 5 percent sulfuric acid. The reaction product is "filter acid" or about a 30–32 percent $P_2O_5$ wet process acid which still contains about 1.5–2.5 percent of $H_2SO_4$ and 1.5–4.0 per cent of fluorine. In the further treatment, this acid is concentrated by evaporation to produce about 54 percent $P_2O_5$ solution which is commercial wet process acid. During the concentration, most of the fluorine is vaporized as $SiF_4$ and HF and must be recovered from the vapor by scrubbing with water. The solution obtained contains large amounts of silicofluoride and silica in the aggregate and deep ponds of this waste cover large areas. It is therefore worthwhile to remove the fluorine in a useful form by the process of this invention before the concentration step which will reduce atmospheric fluorine pollutants and cost of scrubbing. There are other advantages such as greater ease of carrying out the concentration and in providing a phosphoric acid for animal feed production. Such an acid must have a P/F ratio by weight of at least 50 and preferably 100.

Numerous efforts have been made to remove the fluorine at various stages in the manufacture of fertilizer from raw rock. These have usually involved a volatile fluoride or an insoluble fluorosilicate which create problems in themselves. There has not been a successful commercial method of defluorinating at the 30–32 percent $P_2O_5$ stage except by precipitation of an alkali metal silicofluoride of low commercial value.

An analysis of a typical wet process phosphoric acid which may be defluorinated by the process of this invention is as follows:

|      | Per Cent   |
| ---- | ---------- |
| Ca   | 0.14       |
| Al   | 0.313      |
| Si   | 0.496      |
| F    | 2.52       |
| $SO_4^{2-}$ | 2.27 |
| $P_2O_5$ | 30.0–32.0 |

It is clearly evident that this acid is quite impure and it meets no clearly defined specification. The proportion of $P_2O_5$ varies, and the proportion of impurities is also quite variable. A considerable amount of sulfate and fluorine is present, the latter usually as a fluorosilicate although in the rock it is probably present as calcium fluoride. The $P_2O_5$ is not all present as free phosphoric acid since other dissolved phosphate salts are probably present. Actually, there may be 10 to 15 percent less free acid than would be indicated by the $P_2O_5$ content.

SUMMARY OF THE INVENTION

It has been observed that in the impure acid with 30 percent $P_2O_5$ or more, the concentrated impurities apparently force the system to act differently from what would be expected from the pure $CaO-P_2O_5$ solubility relationships. This difference would appear to be due to the presence of dissolved calcium sulfate and free sulfuric acid and possibly fluosilicic acid ($H_2SiF_6$). It has also been observed that is the desulfated system is diluted to below about 25 percent $P_2O_5$, then the system acts very closely according to the pure chemical system. Thus, if the desulfated acid is diluted with water, its reactions will approach those of the $CaO-P_2O_5$ solubility relationships found in the literature.

It is an object of the present invention to manufacture wet process acid with a very low fluorine content directly from the impure acid of variable strength. Another object of the invention is to manufacture a wet process acid satisfactory for animal feed use and, furthermore, to defluorinate phosphoric acid without adding new or extraneous chemicals and more specifically to defluorinate wet process acid by the addition of more phosphate rock.

It is a further object of the present invention to reduce the sulfate content of the wet process acid and form a relatively pure calcium fluoride suitable for use as acid grade fluorospar.

Additionally, it is an object of the present invention not only to defluorinate the wet process acid but in the process to increase the content of $P_2O_5$.

BRIEF DESCRIPTION OF THE DRAWING

The drawing sets forth a phase diagram with solubility curves for the system $CaO-P_2O_5-H_2O$.

DESCRIPTION OF THE PREFERRED EMBODIMENTS

According to the process of the invention, phosphate rock consisting largely of calcium phosphate will be treated as $Ca_3(PO_4)_2$. Phosphate rock is the principal component of fluoroapatite, the main mineral in ore mined in Florida. The formula is also written as $3Ca_3(PO_4)_2 \cdot CaF_2$. Carbonate and hydroxyapatites are also known. Also present in the ore are silica, iron oxide, calcium carbonate, aluminum oxide and organic matter. These all enter into reaction with the acid system. Wet process acid filtered from the acidulation process contains large amounts of sulfuric acid, sulfate ions, and silicofluoride ions which also enter into the reaction stream.

A general understanding of the present invention will be facilitated by reference to the drawing which sets out the phase diagram for the system $CaO-P_2O_5-H_2O$ as disclosed in the 3rd Edition of the monograph "Solubilities of Inorganic and Metal Organic Compounds", Vol. 1, pp. 321–323, D. Van Nostrand (1940) by Seidell and the supplement in 1952 to the 3rd Edition, pp 131–132, by Seidell and Linke. The solubility curves at 25°, 40°, 50°, 75° and 100° C. are set out. It will be readily seen that at 25° C. solubility in terms of CaO may go as high as 5.75 percent CaO with approximately 24–25 percent of $P_2O_5$. The curve at 25° C. from 0 to 25 percent $P_2O_5$ as the highest point represents the solubility curve for dicalcium phosphate ($CaHPO_4.- H_2O$). It will be seen that at 100° C. and 24 percent $P_2O_5$ only about 3.8 percent of CaO can remain in solution. Thus if calcium oxide and $P_2O_5$ are allowed to reach equilibrium at 25° C. and the solution is then heated to 100° C. solid dicalcium phosphate will be precipitated. Thus it is clear that in this system at a number of combinations of CaO and $P_2O_5$ concentrations, heating will result in the precipitation of a solid dicalcium phosphate phase. In other words the solubility curves show that at $P_2O_5$ concentrations of about 25 percent or less, any solution saturated with respect to CaO at any temperature when heated to a higher temperature will precipitate dicalcium phosphate.

With reference to the drawing the equilibrium relationships are more complex between points represented by 25 percent $P_2O_5$ and 25° C. and 40 percent $P_2O_5$ and 100° C. but it is still possible to precipitate dicalcium phosphate under specific conditions. For example, at about 29 percent $P_2O_5$ a solution saturated with respect to CaO at 50° C. will precipitate dicalcium phosphate when heated to 100° C., but a solution saturated at 25° C. will produce no dicalcium phosphate when heated to 100° C. A solution saturated at 75° C. at a $P_2O_5$ content of about 35 percent $P_2O_5$ when heated to 100° C. will precipitate dicalcium phosphate. Beyond the 40 percent $P_4O_5$ at 100° C. point of the drawing the solubility of monocalcium phosphate $CaH_4(PO_4)_2.H_2O$ increases as the temperature is increased.

In order for the defluorination reaction of this invention to proceed the pH must be in a region where the H$^+$ ion concentration is no higher than that of the primary H$^+$ ion of phosphoric acid. In other words, acids which are stronger than phosphoric acid cannot be present in the system. In this specific instance sulfuric and apparently fluosilicic acids must be absent during the desired reaction. Since the pH measurement in systems such as a crude phosphoric acid are not accurate a precise measurement of the pH is difficult, however, in the process of the invention the pH will be in the range of about 2, but more than about 1.

A further requirement for the defluorination to proceed is that there be Ca$^{++}$ ions available in an amount sufficient to react with at least a portion and preferably all of the fluosilicate ions present. In the drawing the designated equilibrium line XY defines the lower limit of availability of calcium in the system. This line, XY, was derived from experimental data using practical times, i.e., within reasonable process operable limits, as the criterion. This line does not represent a true thermodynamic equilibrium but can be approximately described by the following reaction:

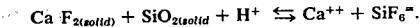

The equilibrium line runs approximately through the points 0.1 CaO and 20 percent $P_2O_5$ and about 3 percent CaO and 40 percent $P_2O_5$. Below 20 percent $P_2O_5$, the operable area is any combination of $P_2O_5$ and CaO levels below the maximum solubility line for the temperature used. Thus the solubility lines and the XY line define the area of calcium ion available for formation of calcium fluoride, or in other words, the "operating area". For example at 24 percent $P_2O_5$ if a solution is saturated with respect to CaO at approximately 25° C. there will be about 5.75 percent CaO in solution. When this solution is heated to 100° C. the concentration will drop to about 3.75 percent CaO by reason of precipitation of dicalcium phosphate. This differential amount will react with fluosilicate. In addition, a further amount of calcium will react represented by the difference in the calcium ion solubility at 100° C. and the equilibrium line, or the CaO concentration will decrease further from about 3.75 to about 0.75. Thus the total available CaO is the difference between 5.75 and 0.75 or 5 percent CaO. In like manner the available CaO at 32 percent $P_2O_5$, if the solution were saturated at 75° C. and heated to 100° C., would be the difference between about 5.25 and about 1.80 or 3.45 percent CaO.

In a system in which the solubility of calcium ions is utilized for the precipitation of $CaF_2$ by hydrolysis of silicofluoride ion, the total calcium available is represented by the difference between the initial concentration and the XY line. The time for completion of the reaction varies from minutes to hours depending on the relative availability of Ca$^{++}$ ions and the reaction temperature. Completion of the reaction occurs when one of the components, available calcium or silicofluoride is depleted.

The XY line may also be related to $CaF_2$ solubility as affected by the hydrogen ion concentration of the system. This line covers the pH range of 0.1 to 1.75 and since the equilibrium line intersects the $P_2O_5$ axis at about 20 percent $P_2O_5$ the inference can be drawn that below this point any combination of Ca$^{++}$ ions and F$^-$ ions according to the process of the invention will cause precipitation. When the pH of the system is raised above about 2 most of the primary H$^+$ ions of phosphoric acid are destroyed. When the pH of the system is lowered below about 0.1 then the following equilibria

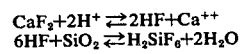

become effective.

Another requirement for the reaction to proceed according to the process of the invention is that some amount of dicalcium phosphate be initially precipitated by a heating process. Thus a 32 percent $P_2O_5$ solution when saturated with respect to CaO at 25° C. contains a considerable amount of CaO, but this is not available since a heating process will not produce any dicalcium phosphate since the CaO solubility increases with temperature.

In summary, there are three (3) specific criteria which are required to effect the desired defluorination of the crude phosphoric acid according to the invention.
1. Control of H$^+$ion concentration,
2. Attainment of a required available Ca$^{++}$ ion concentration, and
3. The ability to cause the precipitation of dicalcium phosphate by heating to a higher temperature.

The following sequential steps illustrate the way in which the invention accomplishes these requirements and effects defluorination of wet process phosphoric acid.

The crude wet process phosphoric acid is treated with an excess of phosphate rock at any convenient temperature to accomplish the following postulated reactions:

$$2H_2SO_4 + Ca_3(PO_4)_2 \rightarrow Ca(H_2PO_4)_2 + 2CaSO_4$$
$$4H_2SiF_6 + Ca_3(PO_4)_2 \rightarrow 2Ca(HSiF_6)_2 + Ca(H_2PO_4)_2$$

These reactions represent the destruction of the strong acids e.g., sulfuric acid, thus meeting the first requirement for control of $H^+$ ion concentration. In addition to the above reactions there is some reaction of free phosphoric acid as follows:

$$4H_3PO_4 + Ca_3(PO_4)_2 \rightarrow 3Ca(H_2PO_4)_2$$

All three reactions lead to an increase in the total $Ca^{++}$ concentration and thus by a common ion effect cause substantial if not complete precipitation of the dissolved calcium sulfate in the crude wet process phosphoric acid. Since the process of the invention will require that an available $Ca^{++}$ ion concentration be established it is desirable to remove the $CaSO_4$ as the $Ca^{++}$ of the sulfate is not available nor will it contribute to the defluorination. If the starting acid has been diluted before the addition of the phosphate rock the destruction of the strong acids would have been accomplished, but the resulting product would have more $CaSO_4$ dissolved and would thus have less available calcium even at equivalent calcium levels.

The destruction of strong acids, in addition to increasing the available $Ca^{++}$ ions, and desulfation, also increases the $P_2O_5$ concentration in direct proportion to the amount of strong acids destroyed and the degree of reaction of free phosphoric acid. Thus the system which started, for example at 30 percent $P_2O_5$ will approach 35 percent $P_2O_5$. The drawing will indicate that at for example, 32 percent $P_2O_5$ it is difficult to meet the next two requirements; namely, establishment of a significant amount of available $Ca^{++}$ and the ability to precipitate dicalcium phosphate by heating. Therefore, it becomes necessary to dilute the aqueous solution to a lower $P_2O_5$ level.

The degree of dilution of the aqueous solution which has been denuded of strong acids is a matter of economics which translates in practical terms to the water balance of specific plant operations. In general it has been found that dilution to about 24 percent $P_2O_5$ is sufficient. At this point it should be noted that the 32 to 35 percent solution which was saturated with respect to $Ca^{++}$ after dilution is no longer saturated. Therefore, sufficient $Ca^{++}$ ions must be added to the reaction system to meet requirements 2 and 3.

Thus, the diluted acid is again reacted with an excess of rock to maximize the $Ca^{++}$ concentration by the following postulated reaction:

$$4H_3PO_4 + Ca_3(PO_4)_2 \rightarrow 3Ca(H_2PO_4)_2$$

The drawing would appear to indicate that generally the lower the temperature used in this step, i.e., the addition of phosphate rock, the more $Ca^{++}$ can be solubilized, but it should be noted that the establishment of the required $Ca^{++}$ concentration again increases the $P_2O_5$ content so that the solution which was diluted to, for example, 24 percent $P_2O_5$, will likely increase to the 28–30 percent $P_2O_5$ range depending on specific conditions. Therefore, in the step wherein the $Ca^{++}$ ion concentration is established there is also need for determining a temperature at which to saturate the solution to insure that dicalcium phosphate can be precipitated on heating to a higher temperature than that at which saturation occurred. For example, if the acid which had been diluted to 24 percent $P_2O_5$ were treated with phosphate rock at 25° C. and the $P_2O_5$ concentration increased to some level less than about 30 percent $P_2O_5$ then heating to 100° C. will precipitate dicalcium phosphate. If the level were to reach a $P_2O_5$ percentage of 30 or higher at 25° C. then heating the solution will not produce dicalcium phosphate. Therefore if the $P_2O_5$ percentage is 30 percent it is necessary to establish the $Ca^{++}$ concentrations at temperatures higher than 25° C. for example at temperatures in the 40–50° C. range. Saturation at 50° C. for example allows the $P_2O_5$ concentration to rise to as high as about 32.5 percent and still allow precipitation of dicalcium phosphate on heating to 100° C.

Having met the three requirements noted hereinabove for defluorination, the soluton is then heated to a higher temperature than that at which the final $Ca^{++}$ ion concentration was established. In general the higher the temperature the faster the reaction will proceed.

At this point in the process the following postulated reactions take place:

$$Ca(H_2PO_4)_2 \text{ solution (monocalcium phosphate)}$$
$$\rightarrow CaHPO_4 \text{ solid (dicalcium phosphate)} 4H_2O +$$
$$5CaHPO_4 + Ca(HSiF_6)_2 \rightarrow 6CaF_2 + 5H_3PO_4$$
$$+2SiO_2$$
$$4H_2O + 5Ca(H_2PO_4)_2 + Ca(HSiF_6)_2 \rightarrow 6CaF_2 + 10$$
$$H_3PO_4 + 2SiO_2$$

These reactions are the routes by which defluorination of the wet process phosphoric acid occurs. It should be noted that there are two reagents, mono and dicalcium phosphate, reacting with the postulated calcium acid fluosilicate in solution. Of the two reagents the dicalcium phosphate is the more basic and will preferentially react and therefore will not co-precipitate with the precipitated $CaF_2$.

In the defluorination of the wet process phosphoric acid, i.e., the precipitation of $CaF_2$ as shown above, the $P_2O_5$ concentration of the solution does not change, but the concentration of free $H_3PO_4$ does increase or in other words the $H^+$ ion concentration increases. It is the reaction of the calcium phosphates with the fluosilicates which lead to the increased $H^+$ ion concentration in the final aqueous solution. The degree of defluorination is a function of (1) the available $Ca^{++}$ ions as either di- or mono-calcium phosphate and (2) the amount of fluosilicate ions in the solution. From the above postulated reactions it can be seen that 3 moles of available calcium are required per mole of fluosilicate. If the original solution contained more than a 1 fluosilicate to 3 available $Ca^{++}$ ratio then defluorination of the solution will be incomplete by this differential.

With reference to the drawing the equilibrium line has a slope indicating that as the $P_2O_5$ content increases, the available $Ca^{++}$ ion concentration for defluorination decreases. This relationship indicates that the slope of the equilibrium line is more a function of $H^+$ ion concentration than of $P_2O_5$ content. From a theoretical standpoint, the process of defluorination is counter productive in the sense that the more fluosilicate reacted the more free phosphoric acid and consequently higher hydrogen ion concentration is produced which in turn decreases the available $Ca^{++}$ ions and causes the reaction to stop. Thus, it becomes apparent that when relatively large amounts of fluosilicate must be reacted and removed from a wet process phosphoric acid solution, a means must be provided to not only furnish more $Ca^{++}$ ions but also to remove the $H^+$ ions, which results from the fluosilicate reaction, and to control the $P_2O_5$ level.

In the process of the present invention, the final $Ca^{++}$ ion concentration, prior to heating, is established for example with an excess of added phosphate rock. The excess rock not only hastens attainment of the $Ca^{++}$ ion concentration but serves to maintain the concentration and consume $H^+$ ions during the fluosilicate reaction. In addition, it may also be necessary to add dilution to the system during the reaction to provide control of the desired $P_2O_5$ level since the phosphate rock which is solubilized during reaction as indicated above increases the $P_2O_5$ concentration.

In a preferred embodiment according to the process of the invention, a crude filter acid is treated with a calcium phosphate in the form of phosphate rock to neutralize the strong acids and increase the $Ca^{++}$ ion concentration. In addition, this treatment causes the precipitation of $CaSO_4.2H_2O$ (Gypsum), which may be removed by e.g. filtration. The acid which now has an increased $P_2O_5$ concentration as well as an increased $Ca^{++}$ ion concentration is diluted with water or a dilute phosphoric acid solution. Such a dilute phosphoric acid solution which may be used would be, for example, one having a $P_2O_5$ concentration less than the above phosphate rock treated solution which is to be diluted to the desired $P_2O_5$ operating concentration. Dilute phosphoric acid solutions which may be used are phosphoric acid plant filter wash solutions containing 10 to 15 percent $P_2O_5$ and pond water having 1 to 2 percent $P_2O_5$. At this point, in the process of the invention, the degree of dilution of the treated crude filter acid will be determined. If, for example, it is more important to obtain essentially complete defluorination then compared to the cost of water removal then the $P_2O_5$ concentration is reduced by dilution to a range of about 18 to 22 percent. If the cost of water removal is of more economic importance than substantial defluorination then the process may be carried out with the $P_2O_5$ concentration in the range of 28 to 32 percent which may or may not require dilution with water. Obviously any $P_2O_5$ percentage in the operating range of from about 18 to 32 percent can be selected in order to arrive at a combination of defluorination or water removal, i.e., any combination which will, for example, accommodate maximum defluorination within the water balance of a plant.

Where defluorination is to be substantially complete, as for animal feed production, the treated acid is diluted with water or dilute $H_3PO_4$ to the 18–22 percent $P_2O_5$ range and further treated with an excess of phosphate rock to again saturate the solution with $Ca^{++}$ ions. Further dilution during the defluorination process may be required to control the $P_2O_5$ content within the desired $P_2O_5$ range. This saturation procedure prior to heating the solution may take place at any convenient temperature up to about 75° C. The saturated solution is then heated in the presence of the excess rock to a higher temperature preferably about the boiling point of the solution to effect the conversion of the fluosilicate to $CaF_2$ while if required maintaining the $P_2O_5$ concentration at the predetermined level by further dilution which may be with water or a dilute phosphoric acid solution.

Where water removal is of importance then the treated acid is diluted if necessary, to 28–32 percent $P_2O_5$ and excess phosphate rock added, preferably at a temperature in the 40°–50° C. range while maintaining the desired $P_2O_5$ concentration, if required, by further dilution. Obviously the acid may be diluted to less than 28–32 percent, the phosphate rock added, thus allowing the $P_2O_5$ concentration to rise to the desired 28–32 percent range. The saturated solution is then heated in the presence of the excess rock to a higher temperature preferably about the boiling point of the solution to effect the conversion of the fluosilicate to $CaF_2$ while maintaining the $P_2O_5$ concentration at the predetermined level, if required, by further dilution.

In carrying out the process of the invention some dissolved but unreacted calcium phosphate wll remain in the defluorinated acid. The amount will be in proportion to the excess rock used in the fluosilicate conversion step. If such dissolved calcium phosphate is undesirable it can be substantially reduced and controlled by adding only a sufficient mount of rock during the fluosilicate conversion step to satisfy the $Ca^{++}$ ion requirement of the fluosilicate content.

In its broadest aspects the present invention is a method for reducing the fluorine content of wet process acid while increasing the phosphoric acid content without the addition of extraneous chemicals. By the process there is obtained a solid fluoride concentrate ($CaF_2$) in a solid useful form substantially free of silica, and may be substantially pure calcium fluoride.

The process of the present invention is advantageous and economical and results in an increase in total free phosphoric acid content by means of the conversion of fluosilicate with phosphate rock to the free phosphoric acid. A further advantage is the reduction in the sulfate content since calcium sulfate is precipitated on the initial addition of phosphate rock. Further, there is provided a rather pure calcium fluoride. In any event, the fluorine concentrate or $CaF_2$ solid obtained may be used for the preparation of hydrofluoric acid.

A typical sample of wet process acid containing 30 percent $P_2O_5$ was received and 15 percent of phosphate rock was added to this solution and allowed to reach equilibrium at room temperature by saturation with the calcium phosphate (phosphate rock) and precipitation of calcium sulfate which was then filtered off along with the excess phosphate rock. The desulfated solution was then adjusted to 20 percent $P_2O_5$ by dilution with water and then saturated with calcium by the addition of an excess (15 percent by weight of the diluted acid) of phosphate rock at 50° C. After saturation the temperature was then raised to the boiling point of the solution (100° C.–102° C.) causing the precipitation of calcium fluoride, which was filtered off leaving a phosphoric acid solution. In the process, the $P_2O_5$ content increased to about 22.5 percent and the final acid contained about 0.1 percent of fluorine which represents about 94.8 percent defluorination.

Thus, within the described procedures, the process of the instant invention comprises adding phosphate rock to a crude wet process phosphoric acid, precipitating $CaSO_4$ and obtaining a solution essentially saturated with $Ca^{++}$ ions, adjusting the concentration of $P_2O_5$ to a predetermined level by dilution, again adding phosphate rock to establish a maximum $Ca^{++}$ ion concentration, diluting, if required, to the established predetermined $P_2O_5$ concentration, and raising the temperature to about the boiling point, i.e., about 90° C. to 110° C. thus causing precipitation of $CaF_2$, filtering to remove said $CaF_2$ thus producing a solution of phosphoric acid with an enhanced $P_2O_5$ content and a reduced fluorine content as well as a reduced sulfate content.

Partially defluorinated wet process acid may be treated by the same process cycle and a fluorine rich solid precipitated and removed, and the cycling may be continued until the fluorine concentration is reduced to that represented by the solubility of calcium fluoride.

More specifically the invention may be described as the defluorination of wet process phosphoric acid usually having about 30–32 percent $P_2O_5$ in which the sulfate may be first removed and then the concentration of the $P_2O_5$ adjusted in the range of about 18 to 32 percent, and preferably, for essentially complete defluorination, from about 18 to 22 percent $P_2O_5$, ordinarily by dilution with water or dilute $H_3PO_4$, and then treating the diluted phosphoric acid solution at ambient temperature with rock phosphate in an amount calculated to permit the solution to reach its maximum $Ca^{++}$ content, i.e., equilibrium. After equilibrium is approached the temperature of the solution is raised to about the boiling point or within the range of about 90° C. to 110° C. The precipitated fluoride rich solid ($CaF_2$) is removed the liquor again recycled from the above process, if necessary, until the wet process acid is satisfactorily free of fluorine.

The fluorine rich solid ($CaF_2$) is useful for the recovery of hydrogen fluoride and for other applications in which a low silica content is advantageous. To further reduce the silica content of the fluorine rich solid or calcium fluoride with for example less than 10 percent silica, it is possible to do so by making use of the reversible relations:

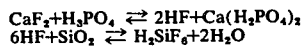

$$CaF_2 + H_3PO_4 \rightleftarrows 2HF + Ca(H_2PO_4)_2$$
$$6HF + SiO_2 \rightleftarrows H_2SiF_6 + 2H_2O$$

Thus where large quantities of phosphoric acid are used sufficient HF is made available to convert the residual $SiO_2$ to $SiF_6$ ion which is removed with the solution phase and can be recycled to the original $CaF_2$ precipitation system. In one example 5 grams of calcium fluoride with 9 percent $SiO_2$ was treated with 100 grams of 47 percent phosphoric acid in a plastic container at 100° C. for 3 hours. The final solid was found to be 99.03 percent $CaF_2$.

More or less detailed claims will be presented hereinafter and even though such claims are rather specific in nature those skilled in the art to which this invention pertains will recognize that there may be equivalents for the specific material recited therein. Some of these equivalents will immediately occur to one skilled in the art and still other equivalents could be readily ascertained upon rather simple routine noninventive experimentation. Certainly no invention would be involved in substituting one or more of such equivalents for the materials specifically recited in the claims. It is intended that all such equivalents be encompassed with the scope of this invention and patent grant in accordance with the well known doctrine of equivalents as well as changing portions of the ingredients which do not render the composition unsuitable for the disclosed purposes. Therefore this application for letters patent is intended to cover all such modifications, changes, and substitutions as would reasonably fall within the scope of the appended claims.

I claim:

1. A process for the defluorination of wet process phosphoric acid containing sulfate ions and fluosilicate ions which comprises adding to the phosphoric acid a calcium phosphate thereby precipitating calcium sulfate and forming an acid solution having an increased $Ca^{++}$ ion and $P_2O_5$ concentration, diluting said acid solution with water to adjust the $P_2O_5$ concentration to within a range of about 18 to 32 percent $P_2O_5$, adjusting the calcium concentration, calculated as CaO, by adding a calcium phosphate at about 25° C. to 75° C. to achieve substantially the maximum calcium content in the solution while maintaining a pH of the acid solution at about 2 or below, raising the temperature of said solution to about the boiling point and maintaining the $P_2O_5$ concentration by dilution with water to within the 18 to 32 percent $P_2O_5$ range and maintaining said solution at the boiling point to effect the precipitation of calcium fluoride, separating the precipitated calcium fluoride from said solution leaving an acid solution having an increase in total free phosphoric acid as compared to the diluted acid solution prior to heating.

2. A process according to claim 1 wherein the precipitated calcium sulfate is separated from solution before adjusting the $P_2O_5$ concentration.

3. A process according to claim 1 wherein the added calcium phosphate is in the form of phosphate rock.

4. A process according to claim 1 wherein the $P_2O_5$ concentration is adjusted to within a range of about 18 to 22 percent $P_2O_5$.

5. A process according to claim 1 wherein the $P_2O_5$ concentration is adjusted to within a range of about 28 to 32 percent $P_2O_5$.

6. A process according to claim 1 wherein the temperature of said solution is raised to between about 90° C. and 110° C. to effect precipitation of calcium fluoride.

7. A process according to claim 1 wherein the pH is maintained in the range of about 2 to about 1.

8. A process according to claim 1 wherein the dilution of the acid solution is carried out with a dilute phosphoric acid solution having a $P_2O_5$ concentration less than the calcium phosphate treated acid solution.

9. A process according to claim 8 wherein the dilute phosphoric acid solution is a filter wash solution containing between about 10 and 15 percent $P_2O_5$.

10. A process according to claim 8 wherein the dilute phosphoric acid solution is phosphoric acid plant pond water containing between about 1 to 2 percent $P_2O_5$.

11. A process according to claim 1 wherein a partially defluorinated final acid solution is recycled to the defluorination process and calcium fluoride precipitated and removed to further defluorinate the solution and increase the total free phosphoric acid content thereof.

12. A process for the defluorination of wet process phosphoric acid containing sulfate ions and fluosilicate ions and having about a 30 to 32 percent $P_2O_5$ content which comprises the steps of:

a. adding phosphate rock to the wet process phosphoric acid to precipitate calcium sulfate;
  b. removing the precipitated calcium sulfate leaving an acid solution having an increased $Ca^{++}$ ion and an increased $P_2O_5$ concentration;
  c. adjusting the concentration of $P_2O_5$ of the acid solution to about 18 to 32 percent $P_2O_5$ by diluting said acid solution with water or a dilute phosphoric acid solution;

d. adding phosphate rock at ambient temperature to the diluted acid solution to adjust the calcium concentration and achieve substantially the maximum calcium content, expressed as calcium oxide, while maintaining the pH of the acid solution between about 1 and 2;

e. raising the temperature of the solution to within a range of about 90° C. to 110° C. and maintaining the $P_2O_5$ concentration to within about 18 to 32 percent $P_2O_5$ by dilution with water;

f. maintaining the solution at a temperature within a range of about 90° C. to 110° to 110° C. to precipitate a calcium fluoride substantially free of silica; and g. removing the precipitated calcium fluoride and recovering the defluorinated phosphoric acid.

13. A process according to claim 12 wherein the $P_2O_5$ concentration is adjusted to within a range of about 28 to 32 percent $P_2O_5$.

14. A process according to claim 12 wherein the $P_2O_5$ concentration is adjusted to within a range of about 18 to 22 percent $P_2O_5$.

15. A process according to claim 12 wherein the precipitated calcium fluoride is treated with phosphoric acid to further reduce the $SiO_2$ content.

* * * * *